US005736665A

United States Patent [19]

Fukumoto et al.

[11] Patent Number: 5,736,665

[45] Date of Patent: Apr. 7, 1998

[54] HOLONIC RHYTHM GENERATOR FOR GENERATING A RHYTHMIC VIBRATION STATE DESCRIBED BY A NONLINEAR VIBRATION EQUATION

[75] Inventors: Akira Fukumoto; Takahiro Yamada, both of Hirakata; Hiroyoshi Komobuchi, Kyoto, all of Japan

[73] Assignee: Matsushita Electric Industrial Co., Ltd., Osaka, Japan

[21] Appl. No.: 629,107

[22] Filed: Apr. 8, 1996

[30] Foreign Application Priority Data

Apr. 7, 1995 [JP] Japan ........................ 7-082244

[51] Int. Cl.[6] ........................ G01H 1/40; G01H 5/00

[52] U.S. Cl. ........................ 84/667; 84/668

[58] Field of Search ........................ 84/611, 612, 635, 84/636, 667, 668, 713, 714

[56] References Cited

U.S. PATENT DOCUMENTS 5,067,160 11/1991 Omata et al. .
5,138,928 8/1992 Nakajima et al. .
5,227,574 7/1993 Mukaino .
5,486,646 1/1996 Yamashita et al. ........................ 84/635
5,521,324 5/1996 Dannenberg et al. .

*Primary Examiner*—William M. Shoop, Jr.
*Assistant Examiner*—Jeffrey W. Donels
*Attorney, Agent, or Firm*—Ratner & Prestia

[57] ABSTRACT

To present a holonic rhythm generator capable of generating rhythm following free changes by transmitting the intent of tempo change from the action of man to rhythm generator in real time, or, to the contrary, guiding the action rhythm of man gradually by the rhythm generator. To achieve the object, the device has a rhythm generator having such constitution described by a nonlinear vibration equation which is a van der Pol's formula a constant portion of which is replaced by a cubic expression, and a fixed rhythm generator and action rhythm detector for generating an input signal of the rhythm generator, in which a specific relation is given between the fixed rhythm generator and action rhythm detector.

18 Claims, 15 Drawing Sheets

Holonic metronome

ARROW INDICATES MIDI SIGNAL
I:IN
O:OUT
T:THROUGHT

HOLONIC RHYTHM GENERATOR FOR GENERATING A RHYTHMIC VIBRATION STATE DESCRIBED BY A NONLINEAR VIBRATION EQUATION

BACKGROUND OF THE INVENTION

1. Field of the Invention

The present invention relates to a basic technique of human interface for transmitting the intent of man to machine, and simultaneously transmitting the reaction of machine to man, and more particularly to a holonic control device for creating a free rhythm in real-time response to the mood or sentiment of man concerning an electronic device incorporating a rhythm generator. The term "holonic" is a novel control concept learned from creature "machine (system) which is given a purpose voluntarily generates or changes an execution mode depending on the change of surrounding circumstances."

2. Related art of the Invention

FIG. 14 shows a basic constitution of a general computer music system. A general electronic keyboard instrument with limit functions is constituted similarly, in principle. In FIG. 14, a computer 1001 is coupled with MIDI devices of sound source A1008, sound source B1009, drum machine 1004, MIDI mixer 1005, and effector 1010, through a MIDI interface 1002. Outputs of the two sound sources and drum machine 1004 are mixed by the mixer 1005, and sent out. The MIDI mixer 1005 can be controlled by MIDI (not the data of sound itself, but information of which keyboard has been pressed). FIG. 15 shows a basic principle of rhythm generation by the drum machine 1004. In FIG. 15, the number of reference clock pulses generated by the clock generator 1011 is counted by a counter 1012, and the number of pulses corresponding to the tempo preset in an operation panel 1014 is judged by a pulse counter 1013, and the determined tempo is sent into the MIDI mixer 1005.

In this conventional constitution, however, only the rhythm sound of the preset regular tempo can be delivered. In the case of sight playing, therefore, it may be possible to play according to the specified tempo in easy passages, but it is impossible to follow the specified tempo in difficult passages, and the player may lose the willingness to continue practice. To the contrary, if a slow tempo is set according to the difficult passages, it is boring to drill the easy passages, which also deprives the player of the willingness. In an electronic musical instrument, it is possible to alter the tempo setting while playing, but such manipulation during playing will interrupt the concentration on performance.

A similar problem may occur when a slightly advanced player plays an electronic musical instrument by using an automatic accompaniment function. An automatic accompaniment unit incorporated in a conventional electronic musical instrument precisely plays back the programmed accompaniment. Indeed, it is possible to program the tempo like "fast here, slow here," but it is impossible to express delicate changes of the tempo demanded by the heightened mood during performance. Hence there is always a feel of dissatisfaction of the rhythm of the electronic musical instrument not matching with the mood during performance. This dissatisfaction is stronger for an advanced player who expresses varied sentiments by fast and slow rhythm. In the prior art, however, it is impossible to follow the free tempo changes of the player in real time.

A more delicate problem occurs when a distinguished player performs in a band with plural members. In band performance, it is essential to Synchronize the "breath" among members, but unless professionals, some members may be often delayed by a half note. This is because there is an individual difference in the delay time of action in performance after hearing the basic rhythm. This problem cannot be ignored when performing on a wide stage. In a stage performance, each player wears headphones to monitor the sound of other players in order to avoid time lag due to propagation of sound, but it is hard to match the tempo if there is an individual difference in time delay. To synchronize the "breath" of performance in such circumstance, it requires to catch the rhythm changes depending on the sentiment of the players in real time, and adjust the phase of the rhythm given to each member so that the tempo of each member may be matched when hearing at the audience seats. With the prior art, however, it is impossible to realize such function in real time in the field.

In the case of karaoke singing, by detecting the tempo and its changes from the gesture and the time keeping action of the singer in real time, when the tempo of karaoke playback is adjusted accordingly, it will be easier to sing, and bad singing may give an impression of an original characteristic expression. Such control is, however, in the existing karaoke.

From a different point of view, to improve the skill of playing or singing, a desired function is to generate a rhythm at the limit of the individual capacity to follow up and gradually guide to a correct rhythm so that the player may keep courage until accustomed to the correct rhythm. Such function was also impossible in the prior art.

SUMMARY OF THE INVENTION

The invention is intended to solve the problems of the prior art from the viewpoint of using the electronic musical instrument more comfortably, which requires to satisfy the conditions of (1) detecting the action rhythm created by the player from the motion of the player without disturbing the performance, (2) causing the initially set rhythm generation to follow up the action rhythm detected from the player, and (3) creating a specific autonomic rhythm by a rhythm making machine, with the rhythm making machine not completely abiding by the man.

It is hence a primary object of the invention to present a holonic rhythm generator capable of generating the rhythm following up the free changes by transmitting the intent of tempo change from the motion of the man in real time to the rhythm generator, or, to the contrary, guiding the action rhythm of the man gradually to the fixed rhythm by the rhythm generator.

To achieve the object, the invention presents a holonic rhythm generator comprising a rhythm generator describing the constant portion of van der Pol's formula in a nonlinear vibration equation replacing by a cubic expression, and a fixed rhythm setting unit and an action rhythm detector for generating an input signal into the rhythm generator, wherein a specific relation is given between the fixed rhythm setting unit and action rhythm detector. Meanwhile in the present invention the word "vibration or vibrator" is used but such word "oscillation or oscillator" can be used instead.

The holonic rhythm generator of the invention composed of these means makes use of the function for drawing the nonlinear vibrator, so that the rhythm generator can follow up the rhythm and its changes created by the rhythmic body action of the player in real time, and, to the contrary, the rhythm generator can transmit the rhythm demanding the man to change. Such function is not limited to the electronic musical instrument alone, but when such function is introduced into electronic appliances for making rhythmic controls such as frequency control and cycle control, it is possible to create electronic appliances capable of reflecting the human mood an the action state of the device, or transmitting the recommended action state from the machine to the man.

[Reference Numerals]

Figure 1:
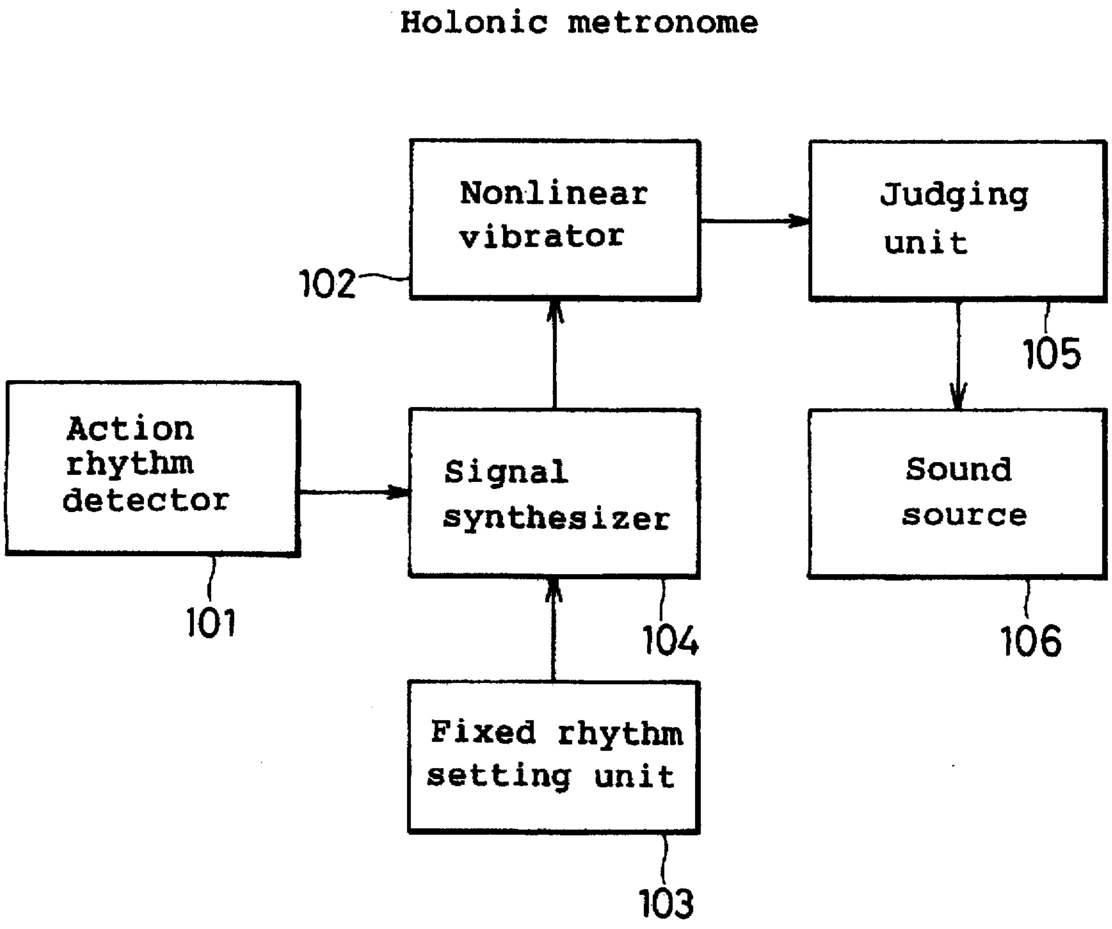
FIG. 1 is a basic structural diagram of the invention.

101 Action rhythm detector
103, 110 Fixed rhythm setting units
102, 107 Nonlinear vibrators
201 Trajectory of nonlinear vibrator on phase plane
Trajectory of time elapse of nonlinear vibrator
204 Curve f (x)
203 Curve g (x)
301 Action rhythm detection signal
402 Acceleration sensor
500 Distance change sensor

PREFERRED EMBODIMENTS (Embodiment 1)

Referring now to the drawings, a first embodiment of the invention is described below.

FIG. 1 is a structural diagram of the first embodiment.

In FIG. 1, reference numeral 101 is an action rhythm detector, 102 is a nonlinear vibrator, 103 is a fixed rhythm setting unit, 104 is a signal synthesize, 105 is a judging unit, and 106 is a sound source. The signal synthesizer 104 operates and processes the signal of the action rhythm detector 101 and the signal of the fixed rhythm setting unit 103. Methods of operation include a simple case of addition, and a case of giving a specific relation between the signal of the action rhythm detector and the signal of the fixed rhythm setting unit. In the latter case, specifically, by giving the relation so that the signal of the action rhythm detector is superior to the signal of the fixed rhythm setting unit, the rhythm generation reflects the mood of the player, or, to the contrary, by giving the relation so that the signal of the fixed rhythm setting unit is superior to the signal of the action rhythm detector, the rhythm generation provides the player with the direction of entire harmony. The nonlinear vibrator 102 receives the output of the signal synthesizer 104, and generates a rhythmic vibration state. The judging unit 105 judges to transform the output state of the nonlinear vibrator 102 in binary form, and drive the sound source 106.

The vibrator for composing the nonlinear vibrator 102 of the invention is described in the first place.

This nonlinear vibrator replaces the constant portion of van der Pol's formula by a cubic expression. This formula has a characteristic similar to that of the formula of Hodgkin and Huxley who received Nobel prizes by mimicking the nerve activities, it is abbreviated as Yano vibrator herein. The nonlinear vibrator mentioned herein refers to this Yano vibrator unless otherwise noted.

The Yano vibrator is expressed by a differential equation of second order (formula 1) in terms of x.

$$\frac{d^2x}{dt^2}+(Ax^2+Bx+C)\cdot\frac{dx}{dt}+f(x)=0 \qquad \text{(formula 1)}$$

Formula 1, f(x) is expressed as in formula 2.

$$f(x)=ax^3+bx^2+cx+d \qquad \text{(formula 2)}$$

Formula 1 can be rewritten in a simultaneous system of differential equations of first order in terms of x and y as in formulas 3 and 4, so that it can be expressed as the motion of motion point M (x, y) on a phase plane.

$$\frac{dy}{dt}=f(x) \qquad \text{(formula 3)}$$

$$\frac{dy}{dt}=-y-g(x) \qquad \text{(formula 4)}$$

In formula 4, g(x) is expressed as in formula 5.

$$g(x)=\frac{A}{3}x^3+\frac{B}{2}x^2+Cx \qquad \text{(formula 5)}$$

Figure 2A:
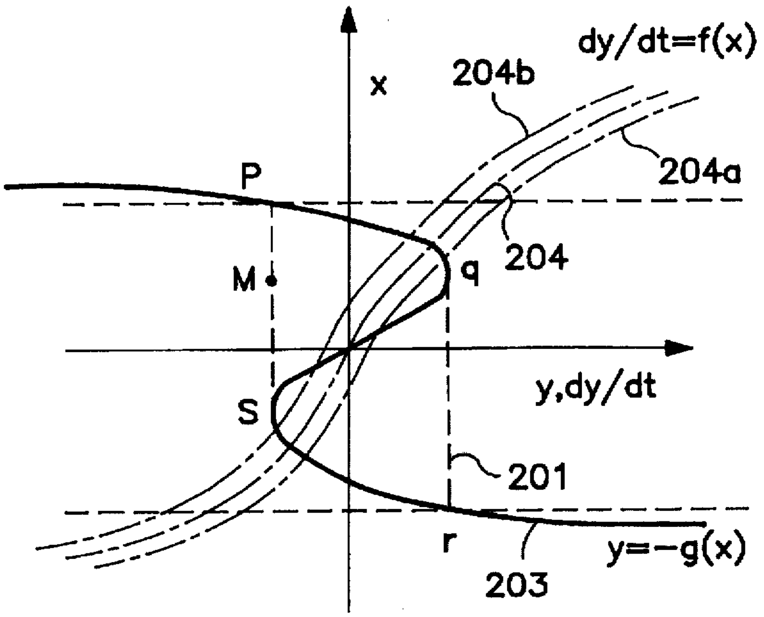
FIGS. 2(A) and 2(B) are a phase plane diagram and time elapse diagram showing behavior of nonlinear vibrator used in a first embodiment conforming to the basic structural diagram of the invention.
Figure 2B:
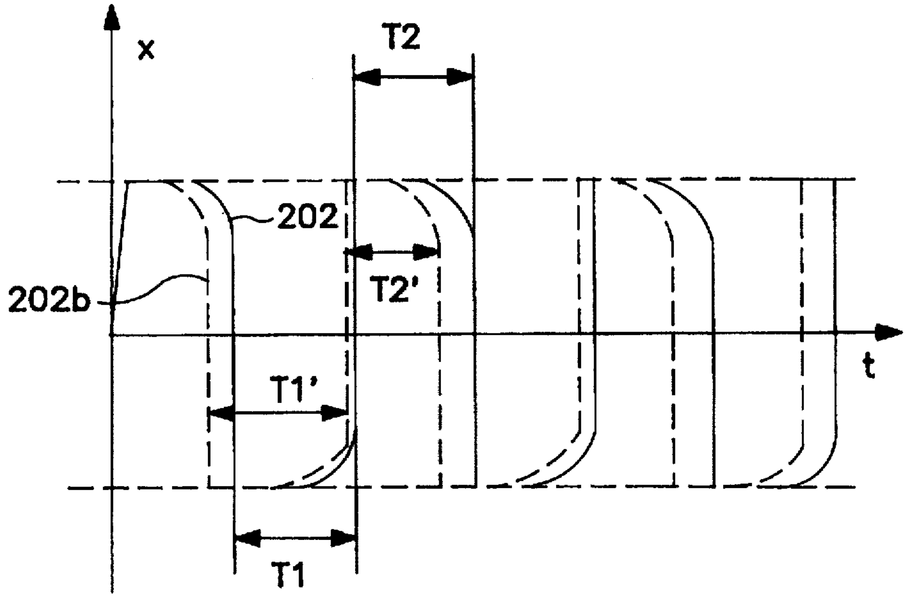

According to formulas 3 and 4, as shown in FIGS. 2(A) and 2(B), the motion point M (x, y) draws a trajectory 201 passing through qprs on a phase plane plotted on the axis of abscissas y and axis of ordinates x. Waveform 202 denotes the time change of motion point M in terms of x. Curve 203 relates to a special case in formula 4, y=−g(x), that is, dx/dt=0, drawn on a phase plane plotted on the axis of abscissas y and axis of ordinates x. Curve 204 relates to formula 3 drawn on a phase plane plotted on the axis of abscissas dy/dt and axis of ordinates x, being superposed on a plane phase plotted on the axis of abscissas and axis of ordinates x.

The motion of the motion point M (x, y) is specifically described below. In the portion (pq and rs) of the motion point M (x, y) moving near curve 203 of dx/dt=0, since dx/dt is close to zero, the motion point M (x, y) moves slowly, and its moving speed is determined by dy/dt. In the portion (qr, sp) departing from the curve of dx/dt=0, dx/dt is a large value, thereby moving fast in the x-direction. As a result, the time change of x possesses both a fast change portion and slow change portion as indicated by waveform 202. In the fast change portion of x (the motion point M of phase plane located at qr or sp), f(x) and g(x) are determined so that dx/dt may be a sufficiently larger value than dy/dt (for example A=1, B=0, C=−30, a=0, b=0, c=0, d=0), and thereby the motion point M (x, y) can move almost parallel to the x-axis in these sections. As a result, the amplitude of the vibrator is determined by the curve 203 of dx/dt=0, and the amplitude is almost constant unless the coefficient of g(x) is changed.

Therefore, only by changing the constant term d of f(x) without changing the amplitude, it is possible to change the time T2 when the motion point M (x, y) is in the section pq near the curve 203 of dx/dt=0, and the time T1 when it is in the section rs. When the motion point M is in the section pq near the curve 203, by increasing the value of d in f(x), dy/dt is shifted to the right as indicated by 204*a*, and dy/dt corresponding to the section pq increases. As a result, the moving speed of the motion point M (x, y) from p to q is accelerated, and the time T2 of the motion point M (x, y) staying in the section pq is shorter, thereby becoming T2'. To the contrary, by decreasing the value of d in f(x), as indicated by 204*b*, dy/dt is shifted to the left, and dy/dt corresponding to the section pq approaches to 0. As a result, the moving speed of the motion point M (x, y) from p to p slows down, and the time, T2 of the action Point M (x, y) staying in the section pq becomes longer. When the motion point M is in the section rs near the curve 203, contrary to the case of presence in the section pq, increase of the value of d makes T1 longer, and decrease of the value of d makes T1 shorter to be T1'.

Figure 3A:
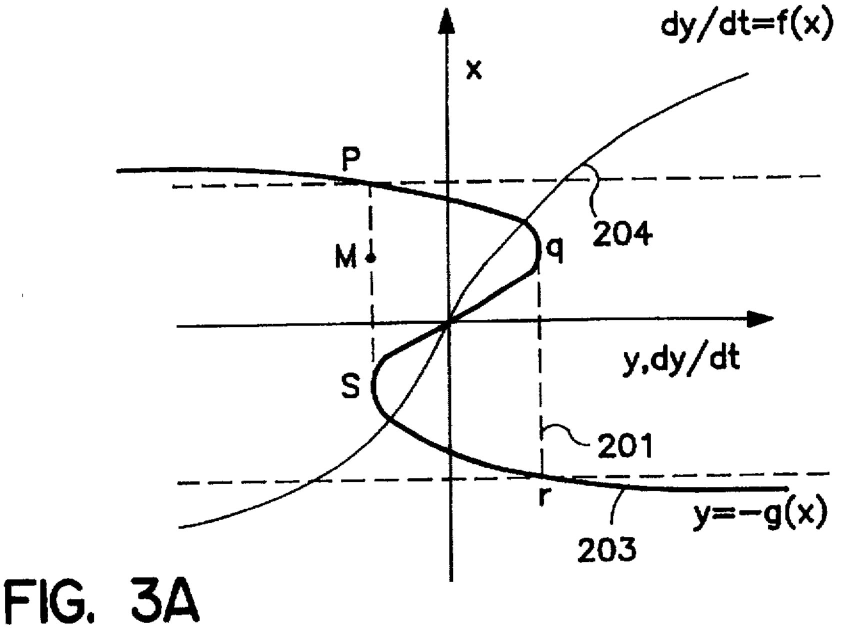
FIGS. 3(A), 3(B) and 3(C) are a phase plane diagram and time elapse diagram showing behavior of nonlinear vibrator in presence or absence of action input in the first embodiment of the invention.
Figure 3B:
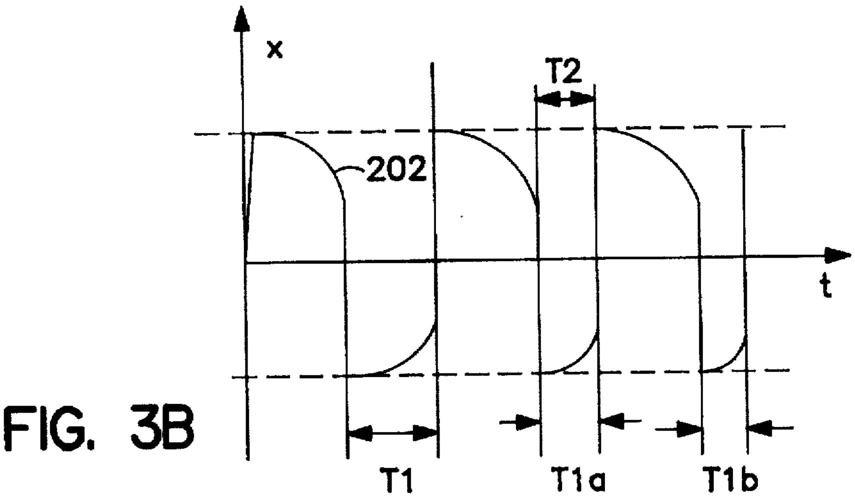
Figure 3C:
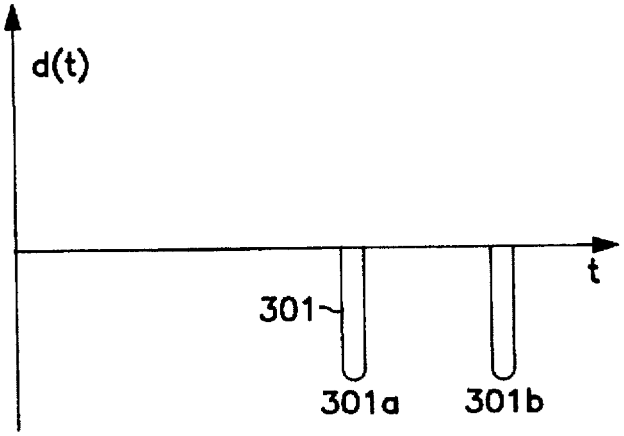

Referring next to FIGS. 3(A)–3(C), the case of changing of d in terms of the time by the signal of the action detector 101 is explained. Those same as in FIGS. 2(A) and 2(B) are identified by same reference numerals. Herein, the value of d in formula 2 is divided into bias d0 and variable d(t), that is d=d0+d(t). If there is no variation by the setting of bias d0, the period of the vibrator can be determined. The variable d(t) 301 is the signal from the action detector 101. When the motion point M (x, y) is in the section rs near the curve 203, if the value of d(t) instantly becomes a negative value of a sufficiently large absolute value, such as 301*a* and 301*b*, the motion point M (x, y) instantly moves quickly to reach point s. As a result, T1 becomes shorter to be T1*a* or T1*b*. To the contrary, if d(t) becomes instantly a positive value, the motion point M (x, y) of the vibrator instantly moves slowly, and hence T1 becomes longer. By repeating the change of d(t) instantly becoming a negative value of a sufficiently large absolute value, the motion point M (x, y) reaches points quickly every time. As a result, the vibrator rhythm can be matched with the rhythm of signal d(t) from the action detector 101 of faster rhythm than the self-excited vibration period T0. Besides, by changing d(t) instantly to a positive value, the motion point M (x, y) of the vibrator instantly slows down, and hence T1 becomes longer. As a result, the rhythm can be matched with the rhythm of the signal d(t) from the action detector 101 of the rhythm slower than the self-excited vibration period T0. Herein, d(t) is explained as an example of instant change, but d(t) may be also changed slowly. When the change of d(t) much slower than the period of the vibrator (self-excited vibration period T0) determined by the bias d0, the time of T1 is shorter and the time of T2 is longer if d(t) is negative. To the contrary, if d(t) is positive, the time of t1 is longer and the time of T2 is shorter. At this time, whether the period is shorter or longer depends on the degree of expansion of the time of T1 and T2.

Figure 4A:
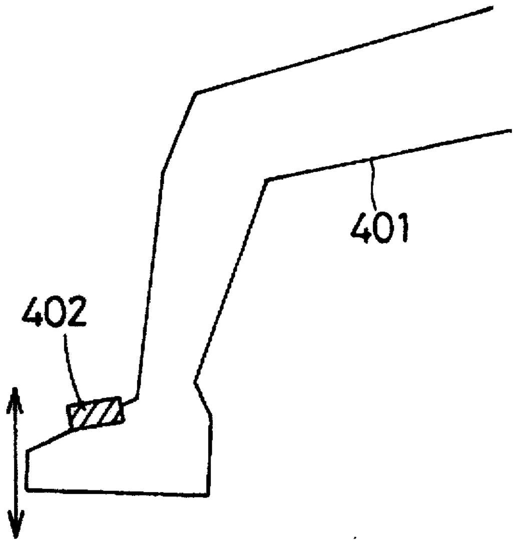
FIGS. 4(*a*)–4(*c*) are diagrams showing methods of use of an angular velocity detector of an action rhythm detector in the basic structural diagram of the invention.
Figure 4B:
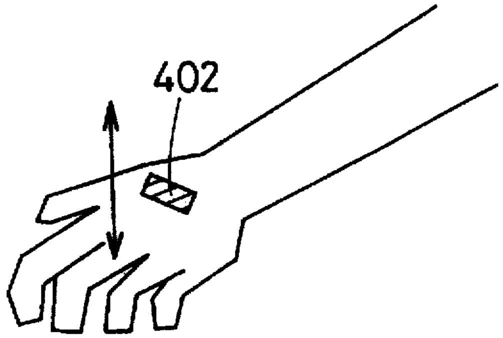
Figure 4C:
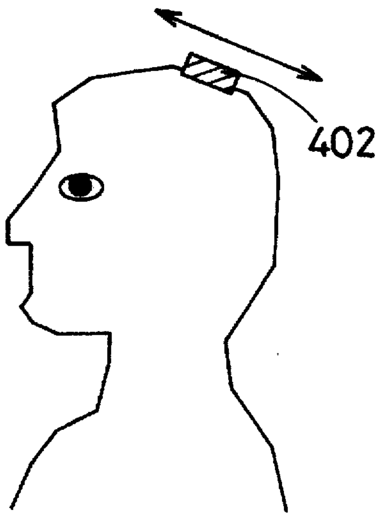

Next, a method of realizing the action rhythm detector 101 is explained by reference to FIGS. 4(*a*)–4(*c*). FIGS. 4(*a*)–4(*c*) are to detect the angular velocity of action. In FIG. 4(*a*), reference numeral 401 denotes the foot of a player of musical instrument or a singer. Reference numeral 402 is a vibratory gyro angular velocity sensor attached to the foot. When the player moves to the ankle up and down to keep the time, the angular velocity is detected by the vibratory gyro angular velocity sensor 402 from the motion of the foot, and the output of the vibratory gyro angular velocity sensor (usually the signal differentially processed is issued from the sensor) is passed through signal processing circuit composed of a band pass filter or the like, and a desired band (0.001 to 0.5 Hz) is taken out. As the method of signal processing, by integral processing, it may be transformed into velocity information.

Figure 5:
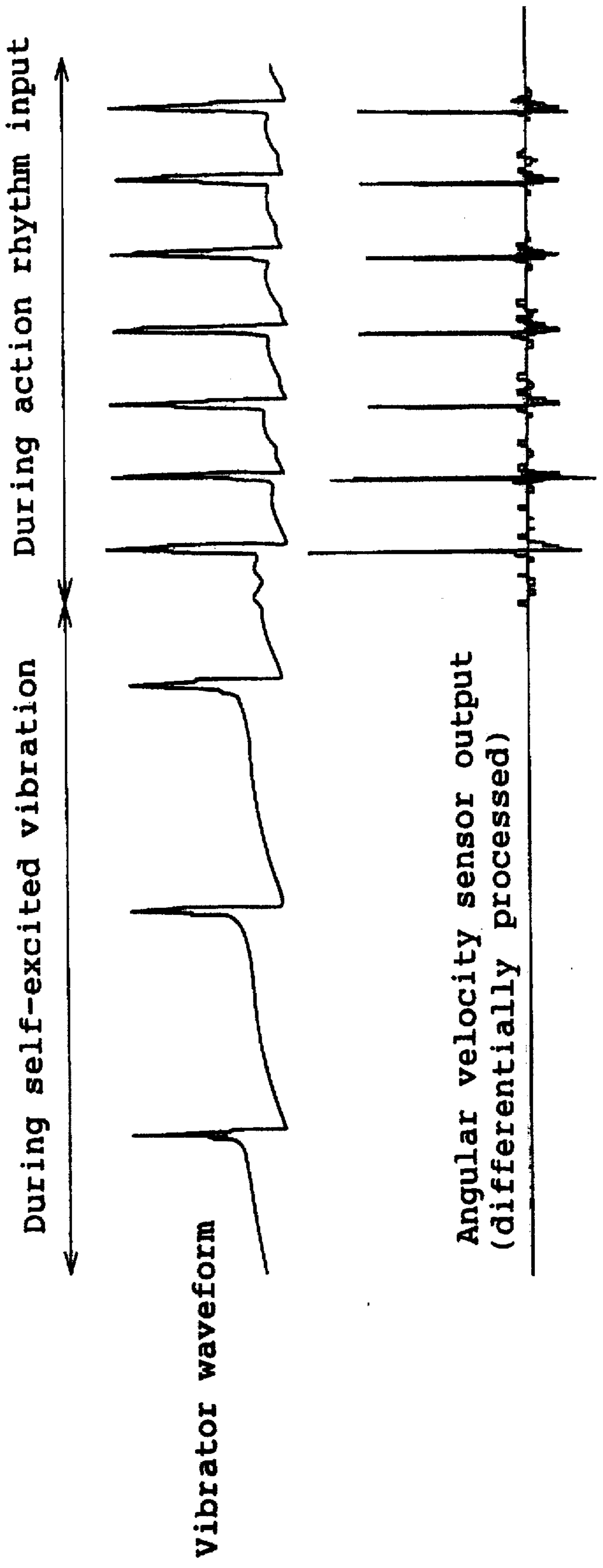
FIG. 5 is a diagram showing a signal waveform of the angular velocity detector of an action rhythm detector in the basic structural diagram of the invention.

FIG. 5 shows the waveform of the nonlinear vibrator of the holonic rhythm generator of the invention, using this signal as the signal of the action rhythm detector 101 in FIG. 1. As shown in FIG. 5, in the absence of signal from the action rhythm detector 101, the nonlinear vibrator is self-excited b the tempo entered from the fixed rhythm setting unit, and when a signal from the action rhythm detector 101 appears, it is quickly changed to the vibration drawn into the rhythm of the detected action tempo.

As the angular velocity sensor, instead of the vibratory gyro angular velocity sensor, piezoelectric acceleration sensor or electrostatic acceleration sensor may be used. The mounting position of the sensor on the body is not limited to the foot, but may be hand as in FIG. 4(*b*), head as in FIG. 4(*c*), or any other position in which the action rhythm can be detected. More specifically, when incorporated into the headphones, waist porch, or belt, the rhythm can be detected from large actions of the player, or when the sensor is built in a ring, earring or other accessories, the rhythm can be detected from small actions of keeping time by the finger or head of the player.

Figure 6A:
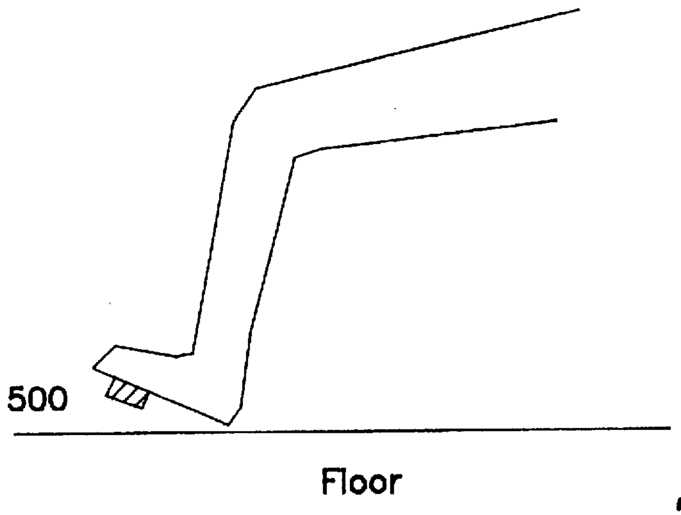
FIGS. 6(A) and 6(B) are is a structural diagrams of a distance change detector by action rhythm detection in the basic structural diagram of the invention.
Figure 6B:
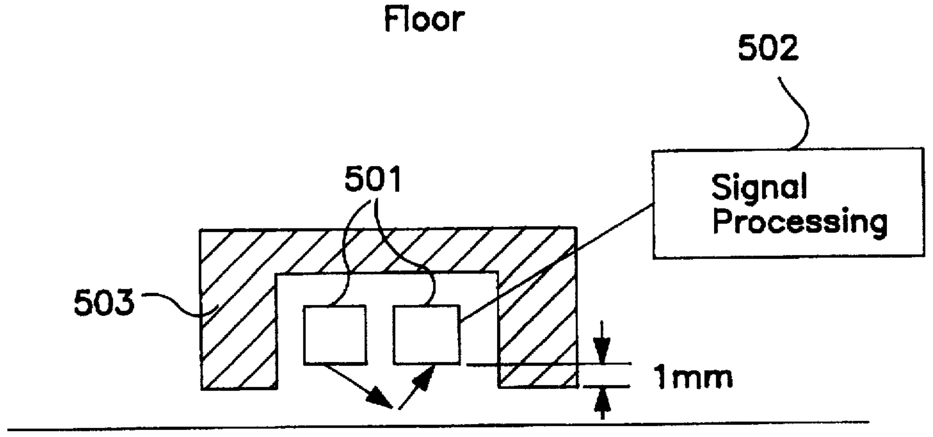
Figure 6C:
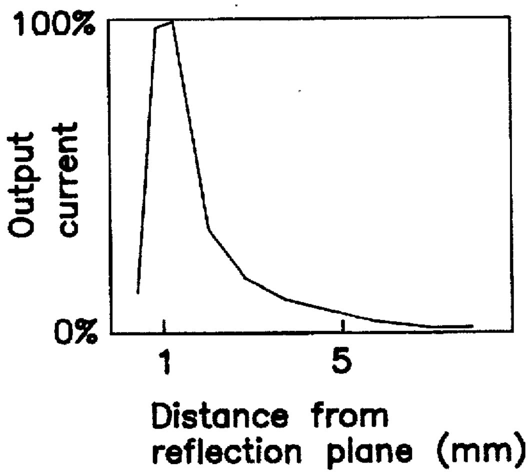

Other example of the action detector 101 is explained by reference to FIGS. 6(A) and 6(B) are is intended to detect distance changes of action. In FIGS. 6(A) and 6(B), reference numeral 501 is a reflection type photo sensor combining a light-emitting diode and a photo transistor, 502 is a signal processing circuit, and 503 is a sensor protector. FIG. 6(C) shows the relation, between the distance of the reflection type photo sensor to the floor and the output current. The reflection type photo sensor 501 is fitted about 1 mm inside of the grounding surface of the sensor protector 503, and it makes use of the portion of the characteristic changing in the output current monotonously as the distance from the floor becomes remoter.

When the player moves the ankle up and down to keep time, the distance between the reflection type photosensor 501 and floor varies, and the output current of the reflection type photo sensor 501 varies. The signal processing circuit 502 converts the output current signal of the reflection type photo sensor 501 into a voltage signal expressing the position, and it is further processed differentially and converted into a voltage signal expressing the velocity. Alternatively, the signal processing circuit 502 processes the output current signal of the reflection type photo sensor 501 by threshold, and converts into a voltage pulse signal.

By using a microphone, moreover, the floor tapping sound by the foot to keep time may be picked up. In this case, however, when sound is generated, d(t) is set at a negative value, and it is suited to generate a rhythm shorter than the reference period.

Figure 7:
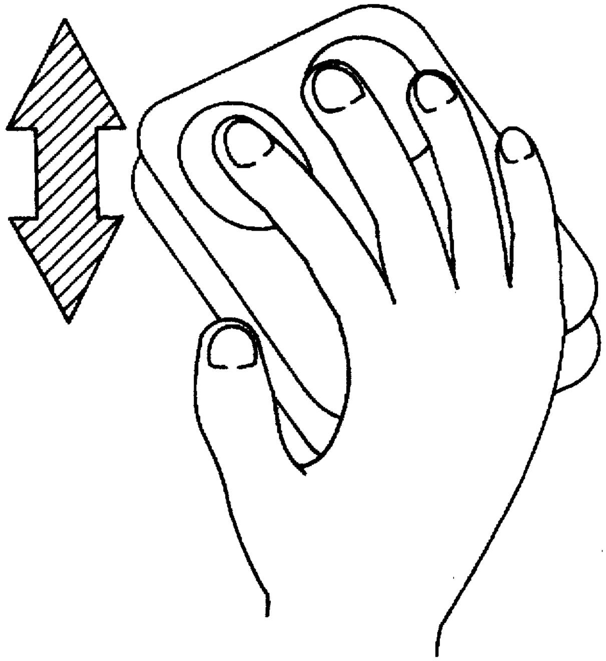
FIG. 7 is a diagram showing the distance change detector by action rhythm detection in the basic structural diagram of the invention, method of its use.
Figure 8:
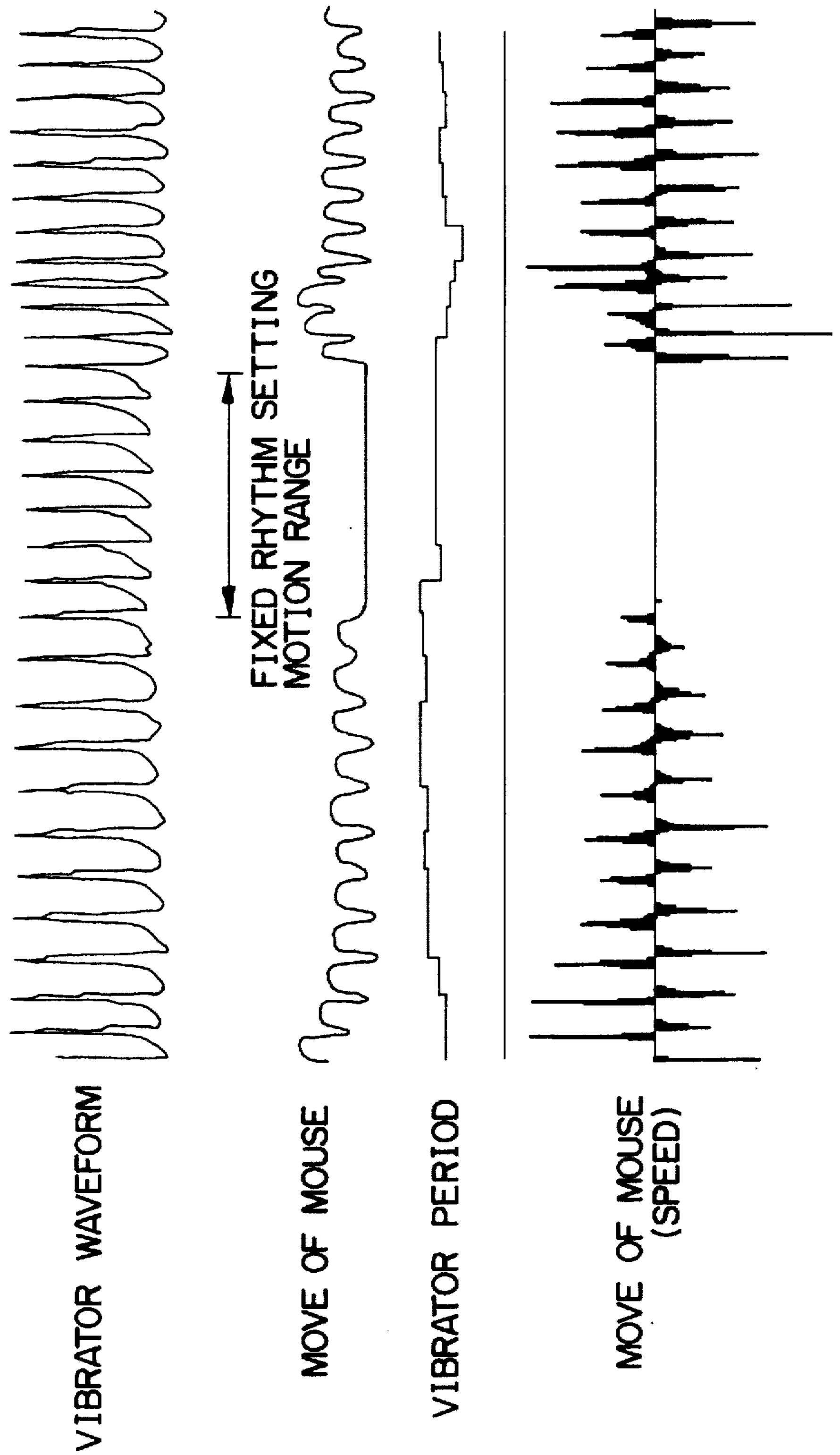
FIG. 8 is a diagram showing signal waveform of the distance change detector by action rhythm detection in the basic structural diagram of the invention.

It is also possible to detect the rhythm from the trajectory of motion. FIG. 8 shows the waveform of a nonlinear vibrator using a mouse as shown in FIG. 7. As shown in FIG. 8, corresponding to the sequence of slow reciprocal motion of the mouse, stopping of the mouse, and fast reciprocal motion of the mouse, the nonlinear vibrator vibrates the tempo slower than the self-excited vibration given by the fixed rhythm setting unit, tempo of the self-excitation, and tempo faster than the self-excitation.

Figure 9A:
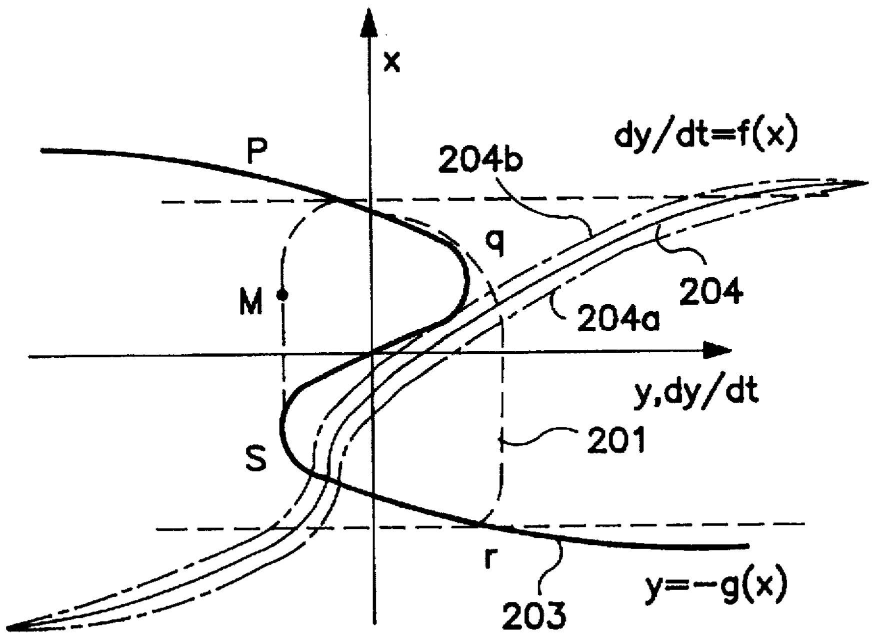
FIGS. 9(A) and 9(B) are a phase plane diagram and time elapse diagram showing behavior of nonlinear vibrator used in a second embodiment conforming to the basic structural diagram of the invention.
Figure 9B:
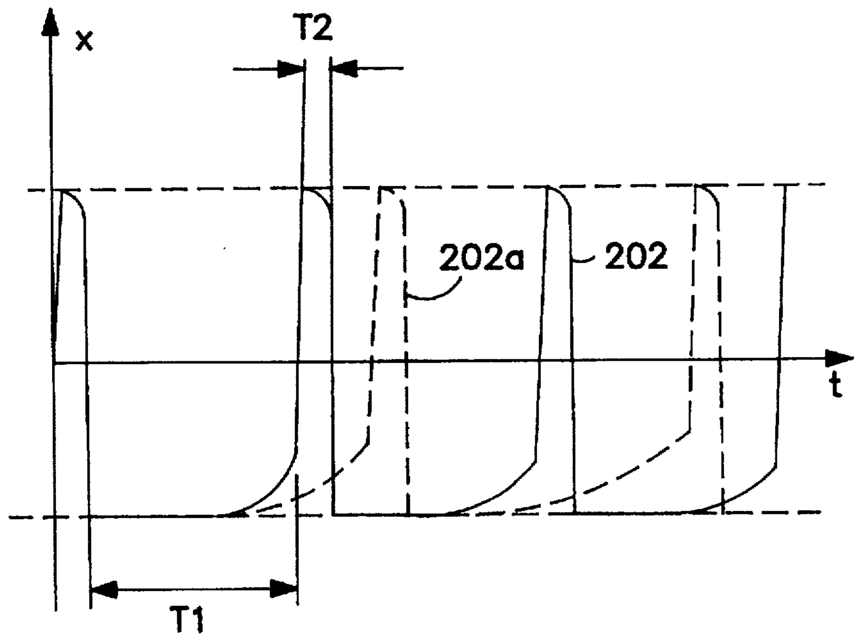

The first embodiment of the invention relates to the condition in which the motion of the nonlinear vibration is easy to recognize, and FIGS. 9(A) and 9(B) shows a second embodiment of the invention in which the nonlinear vibrator is operated in a more desirable condition.

(Embodiment 2)

Those same as in FIGS. 2(A) and 2(B) are identified with same reference numerals. What this embodiment differs from the first embodiment lies in the position of the polarity change point of f(x). In this example, as shown in a phase plane in FIGS. 9(A) and 9(B), the polarity change point of f(x) 204 is moved to the third quadrant of the phase plane, and is located at a position corresponding to the section rs of curve 203.

Only by changing the constant term d of f(x), the time T1 in the section rs can be changed without changing the amplitude, which is same as in the first embodiment. In this embodiment, moreover, due to difference in the position of polarity change point f(x), if d is changed, what differs is that the time T2 when the motion point M (x, y) is in the section pq is hardly changed.

This reason is explained below. In the portion (near pq and rs) of the motion point M (x, y) moving near the curve 203 of dx/dt=0, since dx/dt is closer to zero, and the motion point M (x, y) moves slowly. Therefore, when the motion point M is near the section qp of the curve 203, by increasing the value of d of f(x), dy/dt is shifted to the right as indicated by 204*a*, and dy/dt corresponding to the vicinity of section pq of dy/dt increases. As a result, the moving speed of the motion point M (x, y) from the vicinity of p to the vicinity of q is faster, and the time of the motion point M (x, y) to reach the vicinity of point q is shorter, and hence T2 is shorter, but since dy/dt is a large value initially, if d is small, the change of T2 is very slight. Or, by decreasing the value of d of f(x), dy/dt is shifted to the left as indicated by 204*b*, and dy/dt of the portion corresponding to the vicinity of the section pq is slightly decreased, but it is only by a slight extent that the time T2 of the motion point M (x, y) reaching the vicinity of point q is extended due to slow motion of the motion point M (x, y) from the vicinity of p to the vicinity of q. On the other hand, when the motion point M is near the section rs of the curve 203, since the initial value of dy/dt is small, by increasing the value of d, T1 is extended, or by decreasing the value of d, T1 is shortened.

Figure 10A:
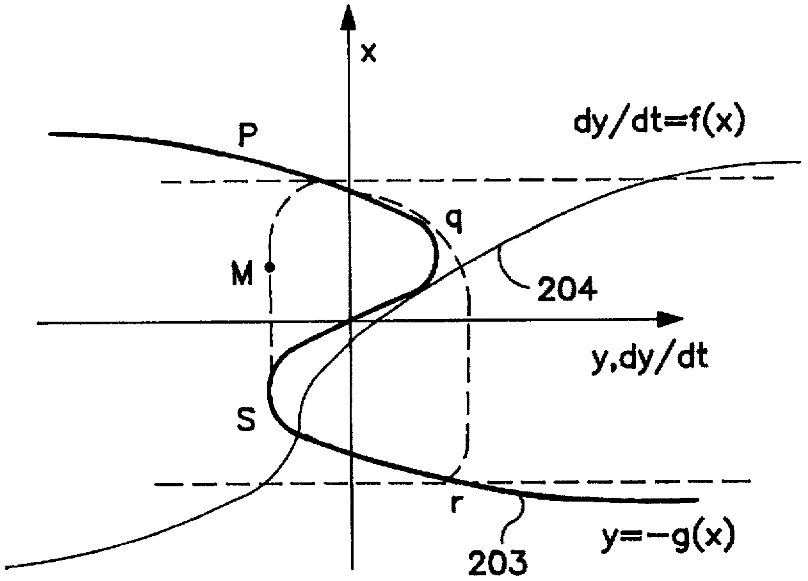
FIGS. 10(A), 10(B) and 10(C) are a phase plane diagram and time elapse diagram showing behavior of nonlinear vibrator in presence or absence of action input in the second embodiment of the invention.
Figure 10B:
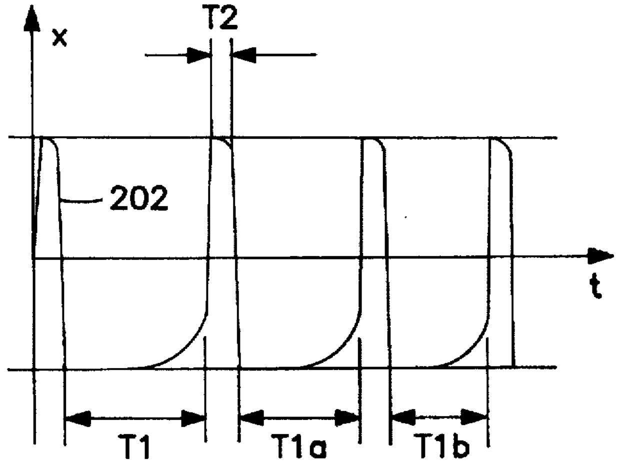
Figure 10C:
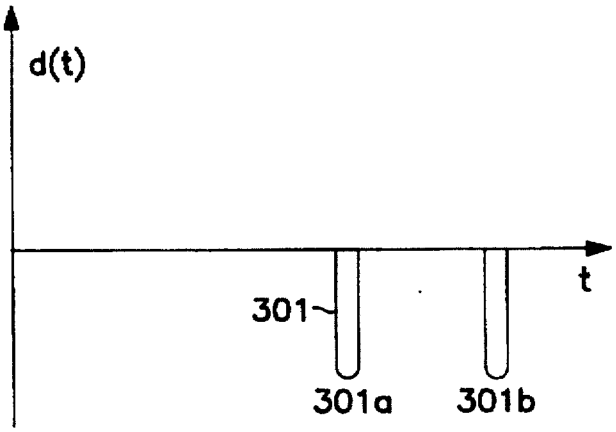

Referring next to FIG. 10(A)–10(C), a case is explained in which d is changed in terms of the time by the signal from the action detector 101. Those same as in FIG. 3(A)–3(C) are identified with same reference numerals. In formula 2, d is divided into bias d0 and variable d(t) as in d=d0+d(t). Same as in the first embodiment, by setting of bias d0, the period of the vibrator can be determined in the absence of vibration. In the first embodiment, the time T1 of the motion point M (x, y) staying in the section pq and the time T2 staying in the section rs were nearly same, it was by a half chance in which time the change of d(t) might occur, and hence it was impossible to control whether to shorten the time T1 or to extend the time T2 when d(t) became negative instantly. In this embodiment, however, T1 is by far longer than T2, and the change of d(t) may be considered to occur always in the section rs. As a result, the motion point M (x, y) is near the section rs of the curve 203, and when d(t) is instantly changed to a negative value of a sufficiently large absolute value as indicated by 301*a* or 301*b*, the motion point M (x, y) instantly moves fast to the vicinity of point s, and therefore by the portion of the departing distance, T1 becomes shorter to be T1*a*, T1*b*. To the contrary, when d(t) is instantly changed to a positive value, the motion point M (x, y) of the vibrator instantly moves slowly, and hence T1 is extended. By repeatedly changing d(t) to a negative value of a sufficiently large absolute value, the motion point M (x, y) reaches the vicinity of point s quickly every time. As a result, the vibrator rhythm can be matched with the rhythm of the signal d(t) from the action detector 101 of the rhythm faster than the self-excited vibration period T0. Moreover, by changing d(t) instantly to a positive value, the motion point M (x, y) of the vibrator instantly slows down its motion, and hence T1 is longer. As a result, the rhythm of the vibrator can be matched with the rhythm of the signal d(t) from the action detector 101 of the rhythm slower than the self-excited vibration period T0. When this change of d(t) occurs while the motion point M (x, y) is in the section pq, the change of d(t) is not reflected in the state of the vibrator, and hence the time of T1 must be set sufficiently longer than T2. For example, in the condition of A=1, B=12, C=1, a=1, b=0, c=−1, d=5, T2 is less than one hundredth of T1. Incidentally, when the signal issued from the action detector 101 is in a pulse form and its width is narrower than that of T2, it may be processed to widen the pulse width.

In the first embodiment, incidentally, when the set value of the bias d0 is increased, it could not be predicted whether the period of the vibrator would be longer or shorter. In this embodiment, when the set value of d0 is increased, the time T2 is shortened only very slightly, and the time T1 is extended, and hence the period of the vibrator becomes longer. To the contrary, when d0 is decreased, the time T2 is extended only slightly, and the time T1 is shortened, and the period is shorter. It is hence easy to set the self-excited vibration period T0.

Figure 11A:
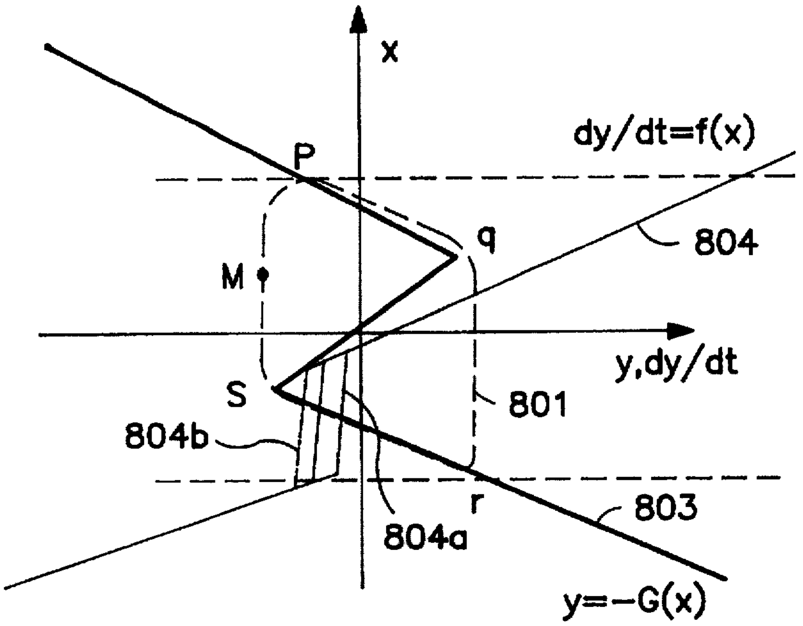
FIG. 11(A) and 11(B) are a phase plane diagram and time elapse diagram showing behavior of nonlinear vibrator of section line type approximation type usable in the first and second embodiments of the invention.
Figure 11B:
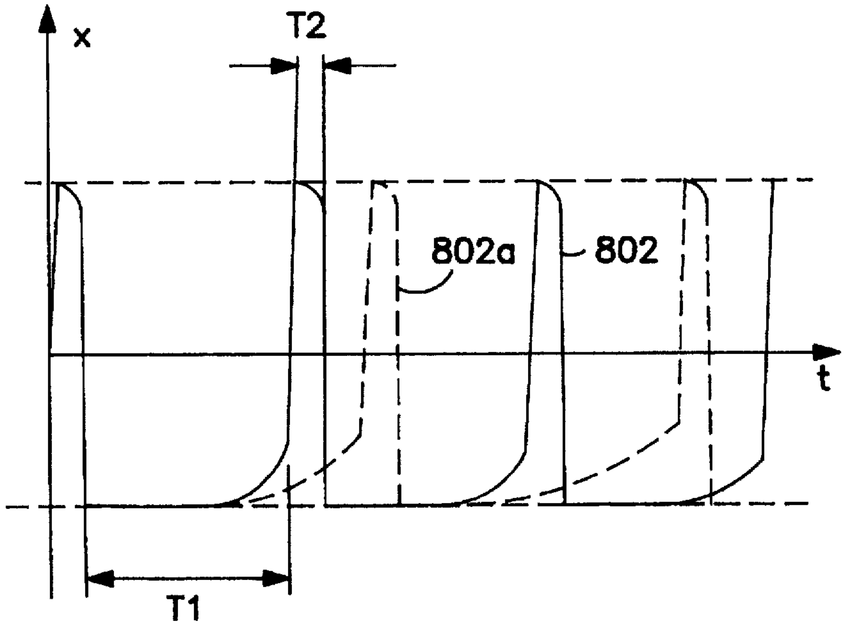

In the first and second embodiments, cubic functions are used in f(x) and g(x), but instead of f(x) and g(x), section linear functions F(x) and G(x) may be used. When using section linear functions, the phase plane of the vibrator is shown in FIGS. 11(A) and 11(B). The motion point M (x, y) draws a trajectory 801 passing through pqrs on a phase plane plotted on the axis of abscissas y and axis of ordinates x. Waveform 802 indicates the time changes of the motion point M (x, y) relating to x. Curve 803 is a curve of a special case of y=−G(x) or dx/dt=0, when using the section linear function G(x) instead of g(x) in formula 5, drawn on a phase plane plotted on the axis of abscissas y and the axis of ordinates x. Curve 804 relates to dy/dt=F(x) drawn on a phase plane plotted on the axis of abscissas y and the axis of ordinates x by using the section linear function F(x) instead of f(x) in formula 3, and superposed on the phase plane plotted on the axis of abscissas y and the axis of ordinates x. The merit of using the section linear functions is to change only the value of F(x) in the section rs relating to T1 as indicated by 804*a*, 804*b*, without changing the value of F(x) corresponding to the section pq relating to T2, so that only T1 can be changed by the input d without changing T2.

Figure 12:
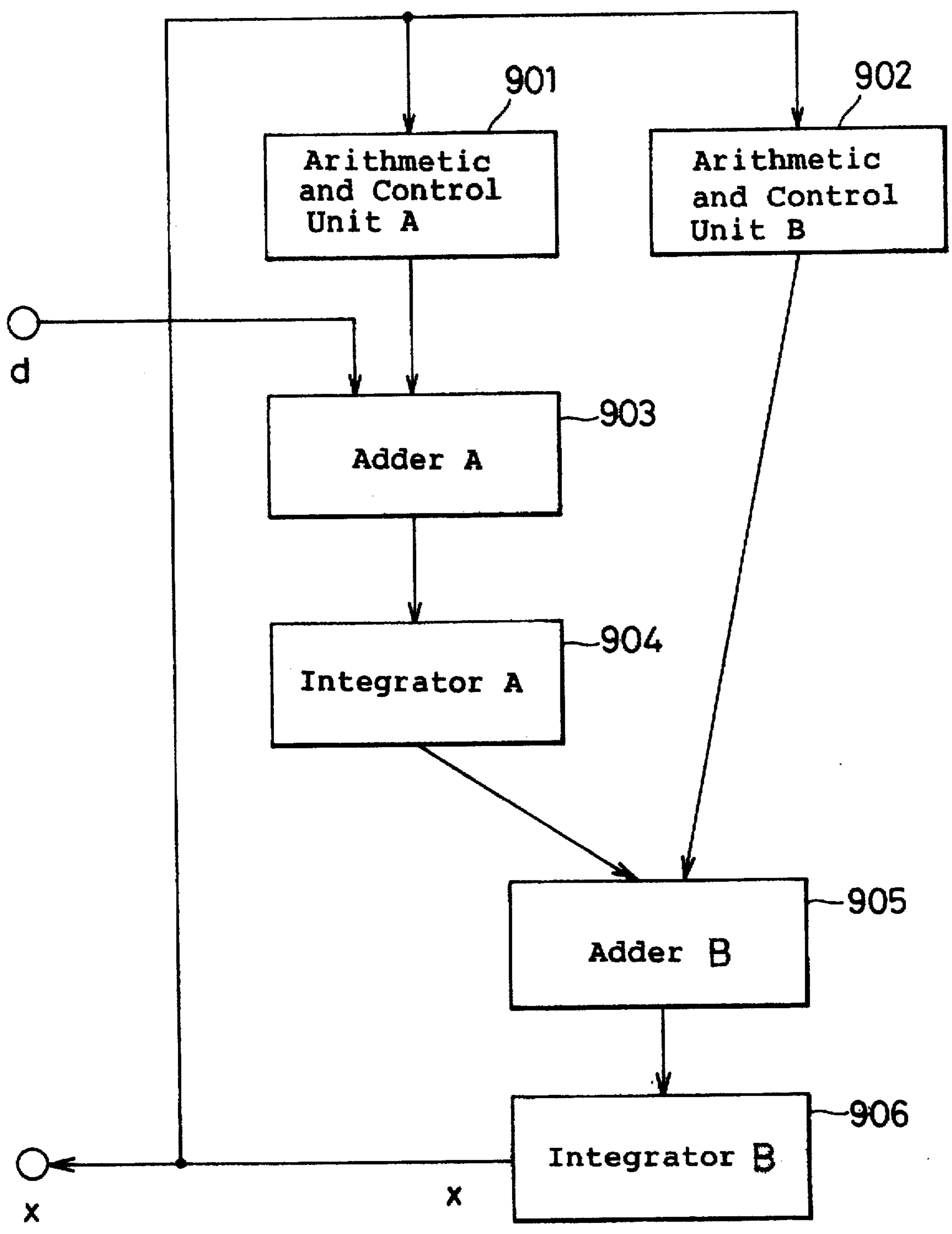
FIG. 12 is a circuit block diagram for realizing the nonlinear vibrator of section line type approximation type.

FIG. 12 is a circuit block diagram of a nonlinear vibrator for realizing a nonlinear vibrator 102 of section line type approximation. Reference 901 is an Arithmetic and Control Unit A, which receives an input x and generates a cubic function f(x) or a section linear function F(x). Reference numeral 902 is an Arithmetic and Control Unit B, which receives an input x, and generates a cubic function g(x) or a section linear function G(x). Reference numeral 903 is an adder A, which sums an input d and the output of the Arithmetic and Control Unit A 901. Reference numeral 904 is an integrator A, which integrates the output of the adder A. Reference numeral 905 is an adder B, which sums an input C, the output of the Arithmetic and Control Unit B 902, and the output of the integrator A. Reference 906 is an integrator B, which integrates the output of the adder B, and outputs X. The self-excited vibration period of this vibrator is set by the bias portion d0 of the input d. The fluctuation portion d(t) of the input d is the output of the action detector 101 (for specific circuit description of the Yano vibrator, see Japanese Laid-open Patent 7-49943).

Figure 13:
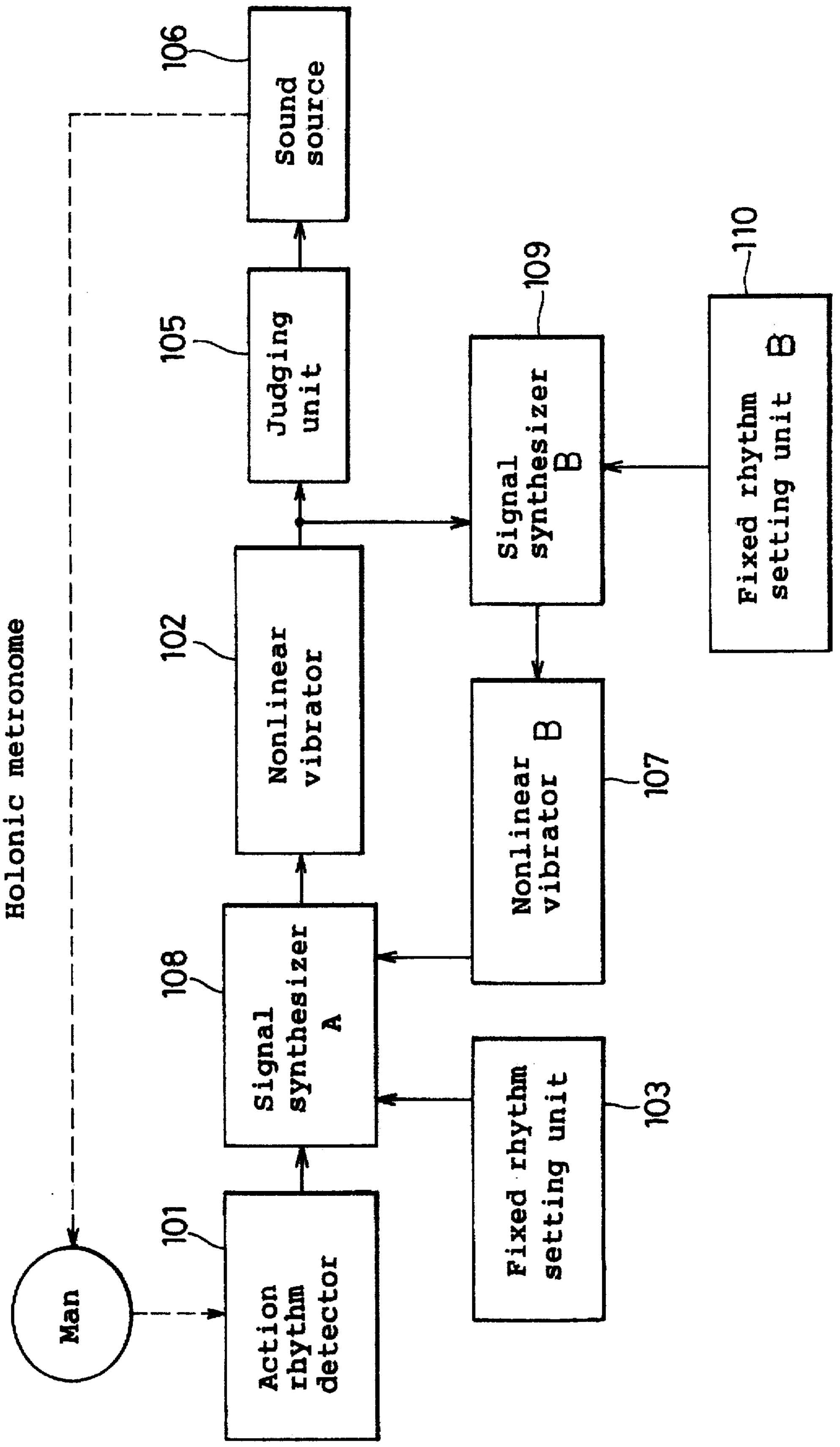
FIG. 13 is an expanded structural diagram of the invention using a plurality (n=2) of nonlinear vibrators.
Figure 14:
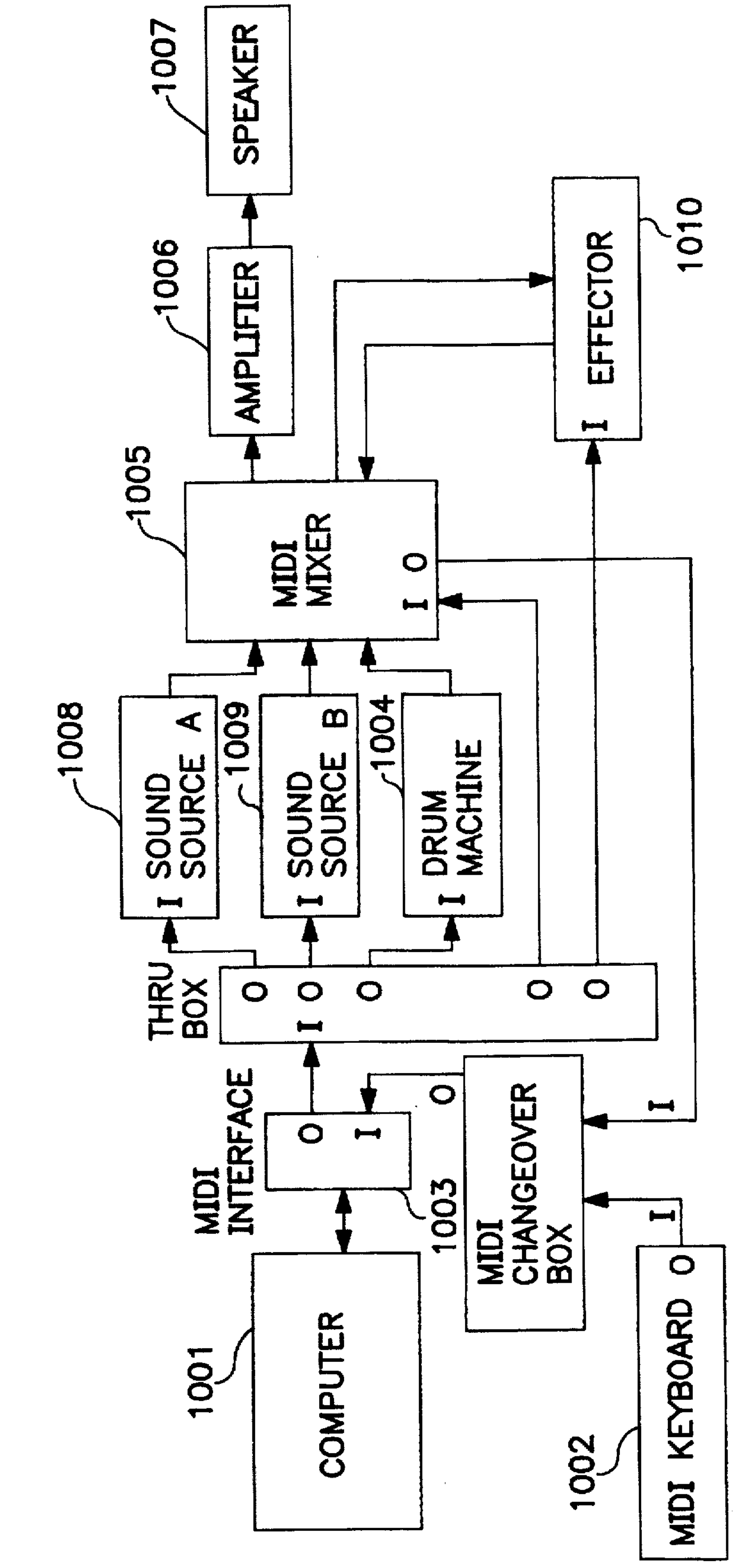
FIG. 14 is a structural diagram of a prior art.
Figure 15:
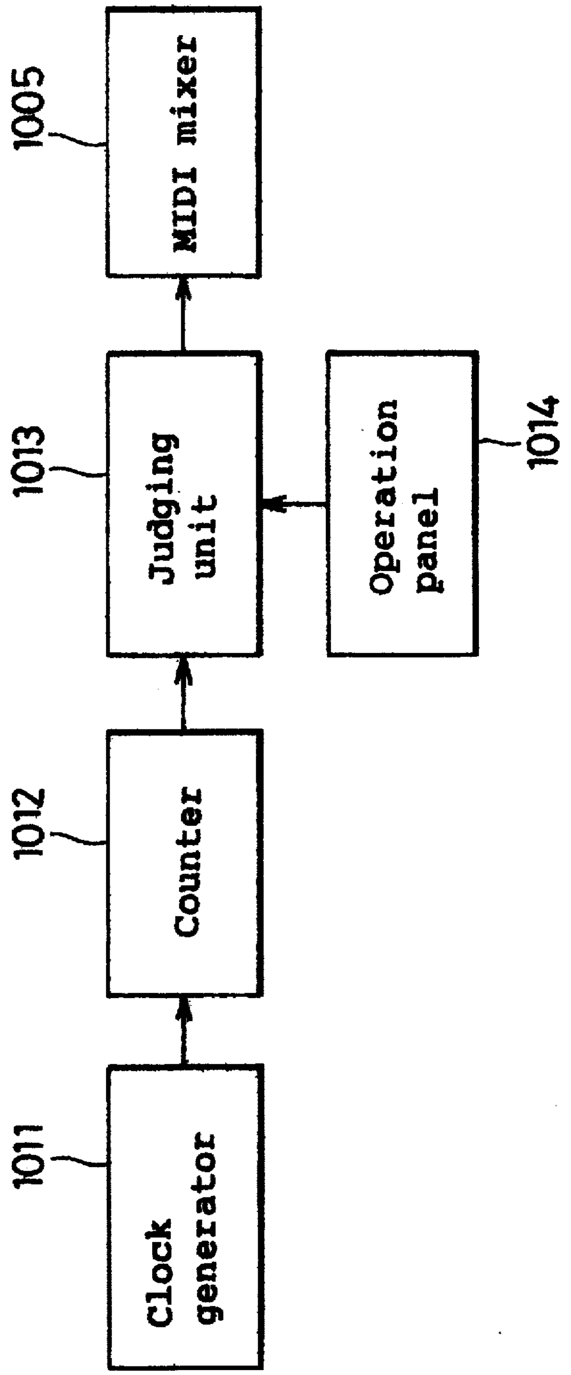
FIG. 15 is a structural diagram of a prior art.

The first and second embodiments are mainly intended to reflect the action rhythm detected from the man and the fixed rhythm setting unit into the rhythm generator in real time. However, as mentioned above, not weighing between the fixed rhythm and action rhythm, for the purpose of supporting to achieve the performance level from follow-up to the action rhythm gradually to the fixed rhythm, it is preferred to give relation between the action rhythm and fixed rhythm by using n (n being a natural number) nonlinear vibrators. FIG. 13 is a structural diagram of a third embodiment (explaining in the condition of n=2) of the invention for realizing such purpose. In FIG. 13, reference numeral 101 is an action detector, 102 is a nonlinear vibrator, 103 is a fixed input setting unit, 105 is a judging unit, 106 is a sound source, 107 is a nonlinear vibrator B, 108 is a signal synthesizer A, 109 is a signal synthesizer B, and 110 is a fixed input setting part B. Those same as in FIG. 1 are identified with same reference numerals. The signal synthesizer A 108 operates and processes the signals from the action detector 101, fixed input setting unit 103, and nonlinear vibrator B 107. The nonlinear vibrator 102 receives the output of the signal synthesizer A, and generates vibration. The judging unit 105 judges the output of the nonlinear vibrator 102, and drives the sound source 106. In this construction, the holonic metronome of the embodiment generates the rhythm matched with the human action rhythm by means of the nonlinear vibrator 102 same as in the first and second embodiments, and as the man is attracted to the rhythm of the sound generated by the sound source, the man can generate the rhythm synchronized with the machine. What this embodiment differs from the first and second embodiments is that the output vibration of the nonlinear vibrator B107 is operated simultaneously in the signal synthesizer A 103, so that the nonlinear vibrator 102 is attracted to the rhythm generated by the nonlinear vibrator B1076 when the rhythm of the man is too slow. However, the signal synthesizer B 109 operates and processes the signals from the fixed input setting unit B 110 and the nonlinear vibrator 102, and the nonlinear vibrator B 107 receives the output of the signal synthesizer B 109, and generates vibration, so that the phase of the nonlinear vibrator 102 and the nonlinear vibrator B 107 is kept constant and is not deviated.

By applying this embodiment, in order to bring about a rhythmic harmony among three or more players, each player may be furnished with the apparatus of the embodiment, and in order to reflect the features of the members, it is also possible to give a certain relation or a relation changing in real time as the time passes, to a plurality of fixed rhythm setting units and a plurality of action rhythm detectors.

As illustrated in the embodiments, the holonic rhythm generator of the invention is a basic technique of human interface, and enables real-time interactions (including unconscious dialogue state) of transmitting the intent of man to machine, and transmitting the reaction of machine to man. This may not be applied only in the rhythm machine of electronic musical instruments as shown in the embodiments, but may be introduced in the appliances that require control corresponding to the reaction of man in real time (air-conditioner, heated carpet, automobile, 3D TV, stereo, word processor, etc.), by combing with sensors for extracting information from man.

What is claimed is:

1. A holonic rhythm generator comprising:

a fixed rhythm setting unit for generating a fixed rhythm signal, an action rhythm detector for generating an action rhythm signal a signal synthesizer for receiving the fixed rhythm signal from the fixed rhythm setting unit and the action rhythm signal from the action rhythm detector and generating a synthesized signal, and a rhythm generator for receiving the synthesized signal from the signal synthesizer and generating a rhythmic vibration state described by a nonlinear vibration equation.

2. The holonic rhythm generator of claim 1, wherein the nonlinear vibration equation is a van der Pol's formula, a constant portion of which is replaced by a cubic expression.

3. The holonic rhythm generator of claim 1, further comprising a judging unit for receiving the rhythmic vibration state of the rhythm generator and transforming the rhythmic vibration state into binary form.

4. A holonic rhythm generator comprising:

a first fixed rhythm setting unit for generating a first fixed rhythm signal, an action rhythm detector for generating an action rhythm signal, a first signal synthesizer for receiving the first fixed rhythm signal from the first fixed rhythm setting unit and the action rhythm signal from the action rhythm detector and generating a first synthesized signal, a first rhythm generator for receiving the first synthesized signal from the first signal synthesizer and generating a first rhythmic vibration state described by a nonlinear vibration equation, a second fixed rhythm settling unit for generating a second fixed rhythm signal, a second signal synthesizer for receiving the second fixed rhythm signal from the second fixed rhythm setting unit and the first rhythmic vibration state from the first rhythm generator and generating a second synthesized signal, and a second rhythm generator for receiving the second synthesized signal from the second signal synthesizer and generating a second rhythmic vibration state described by the nonlinear vibration equation.

5. The holonic rhythm generator of claim 4, wherein the nonlinear vibration equation is a van der Pol's formula, a constant portion of which is replaced by a cubic expression.

6. The holonic rhythm generator of claim 4, further comprising a judging unit for receiving the first rhythmic vibration state into binary form.

7. A holonic rhythm generator comprising:

an action rhythm detector comprising an angular velocity detector for detecting an angular velocity of a motion of an object and generating a signal responsive to the angular velocity, and a rhythm generator for receiving the signal from the action rhythm detector and generating a rhythmic vibration state described by a nonlinear vibration equation which is a van der Pol's formula, a constant portion of which is replaced by a cubic expression.

8. A holonic rhythm generator comprising:

an action rhythm detector comprising a distance detector for detecting a distance of a motion of an object and generating a signal responsive to the distance, and a rhythm generator for receiving the signal from the action rhythm detector and generating a rhythmic vibration state described by a nonlinear vibration equation which is a van der Pol's formula, a constant portion of which is replaced by a cubic expression.

9. A holonic rhythm generator comprising:

an action rhythm detector comprising a motion trajectory detector for detecting a trajectory of a motion an object and generating a signal responsive to the trajectory of the motion, and a rhythm generator for receiving the signal from the action rhythm detector and generating a rhythmic vibration state described by a nonlinear vibration equation which is a van der Pol's formula, a constant portion of which is replaced by a cubic expression.

10. A holonic rhythm generator comprising:

an action rhythm detector comprising a distance detector for detecting sound generated from a motion of an object and generating a signal responsive to the sound, and a rhythm generator for receiving the signal from the action rhythm detector and generating a rhythmic vibration state described by nonlinear vibration equation which is a van der Pol's formula, a constant portion of which is replaced by a cubic expression.

11. A holonic rhythm generator comprising:

a fixed rhythm setting unit and an action rhythm detector for generating an input, and a rhythm generator for receiving the input signal and generating a rhythmic vibration state described by a nonlinear vibration equation which is a van der Pol's formula, a constant portion of which is replaced by a cubic expression, wherein a specific relation is given between the fixed rhythm setting unit and the action rhythm detector.

12. A holonic rhythm generator comprising:

a first fixed rhythm setting unit and an action rhythm detector for generating a first input signal, a first rhythm generator for receiving the first input signal and generating a first rhythmic vibration described by a nonlinear vibration equation which is a van der Pol's formula, a constant portion of which is replaced by a cubic expression, a second fixed rhythm setting unit for generating a second input signal, and a second generator for receiving the second input signal and generating a second rhythmic vibration state described by a nonlinear vibration equation which is a van der Pol's formula, a constant portion of which is replaced by a cubic expression, wherein a specific relation is given among the first fixed rhythm setting unit, the second fixed rhythm setting unit, and the action rhythm detector.

13. A holonic generating comprising:

n rhythm generators for generating n rhythmic vibration states, each described by a nonlinear vibration equation, n being a natural number greater than or equal to 3, n fixed rhythm setting units for providing a respective signal to each one of the n rhythm generators, and n action rhythm detectors for providing a respective signal to each one of the n rhythm generators, wherein a specific relation is given among the n action rhythm detectors and the n fixed rhythm setting units.

14. The holonic rhythm generator of claim 13, wherein the nonlinear vibration is a van der Pol's formula, a constant portion of which is replaced by a cubic expression.

15. The holonic rhythm generator of claim 13, further comprising n judging units for receiving the n rhythmic vibration states of the n rhythm generators and transforming the n rhythmic vibration states into binary form.

16. A holonic rhythm generator comprising:

a fixed rhythm setting unit for generating a fixed rhythm signal, an action rhythm detector for generating an action rhythm signal a signal synthesizer for receiving the fixed rhythm signal from the fixed rhythm setting unit and the action rhythm signal from the action rhythm detector and generating a synthesized signal, and a rhythm generator for receiving the synthesized signal from the signal synthesizer and generating a rhythmic vibration state described by a section line type approximation of a nonlinear vibration equation.

17. The holonic rhythm generator of claim 16, wherein the nonlinear vibration equation is a van der Pol's formula, a constant portion of which is replaced by a cubic expression.

18. The holonic rhythm generator of claim 16, further comprising a judging unit for receiving the rhythmic vibration state of the rhythm generator and transforming the rhythmic vibration state into binary form.

* * * * *

UNITED STATES PATENT AND TRADE MARK OFFICE
CERTIFICATE OF CORRECTION

PATENT NO. : 5,736,665
DATED : April 7, 1998
INVENTOR(S) : Fukumoto et al.

It is certified that error appears in the above-identified patent and that said Letters Patent is hereby corrected as shown below:

Column 10, line 61, delete "settling" and insert --setting--.

Column 11, line 10, between "state" and "into" insert --of the first rhythm generator and transforming the first rhythmic vibration state--.

Column 11, line 42, delete "distance" and insert --sound--.

Signed and Sealed this

Twenty-second Day of September, 1998

*Attest:*

BRUCE LEHMAN

*Attesting Officer*

*Commissioner of Patents and Trademarks*